United States Patent [19]
Davis et al.

[11] Patent Number: 5,191,229
[45] Date of Patent: Mar. 2, 1993

[54] POWER SOURCE TRANSFERRING

[75] Inventors: Eric W. Davis, Prettymarsh, Me.; John C. Studer, Bridgeport, Conn.

[73] Assignee: United Technologies Corporation, Hartford, Conn.

[21] Appl. No.: 629,935

[22] Filed: Dec. 19, 1990

[51] Int. Cl.⁵ .............................................. H02J 9/06
[52] U.S. Cl. ...................................... 307/66; 307/64; 307/86
[58] Field of Search ............... 307/10.7, 10.8, 43–45, 307/48, 64–66, 85, 86

[56] References Cited

U.S. PATENT DOCUMENTS

| | | | |
|---|---|---|---|
| 3,626,239 | 12/1971 | Brock | 307/10.8 X |
| 3,701,904 | 10/1972 | Gardner | 307/10.8 |
| 3,825,798 | 6/1973 | Teich | 307/10.8 X |
| 4,145,617 | 3/1979 | Lee et al. | 307/43 |
| 4,342,946 | 8/1982 | Valenzona et al. | 307/10.8 X |
| 4,385,258 | 5/1983 | Voll | 307/10.8 X |
| 4,492,876 | 1/1985 | Colbert et al. | 307/66 |
| 4,528,459 | 7/1985 | Wiegel | 307/66 |
| 4,818,891 | 4/1989 | Drinkwater | 307/64 |
| 4,864,154 | 9/1989 | Copeland et al. | 307/10.7 |

Primary Examiner—A. D. Pellinen
Assistant Examiner—Fritz M. Fleming

[57] ABSTRACT

A circuit (10) for transferring power delivered to a load (16) from a primary voltage source (12) to a secondary power source (14) uses three transistors (32, 40, 46) which switch whenever there is a loss of power from the primary source (12). A capacitor (36), interposed between the first transistor (32) and the second transistor (40) attenuates the signal from the first transistor (32) after a predetermined amount of time to switch the second and third transistors (40,46) to isolate the load (16) from the secondary power source (14).

4 Claims, 1 Drawing Sheet

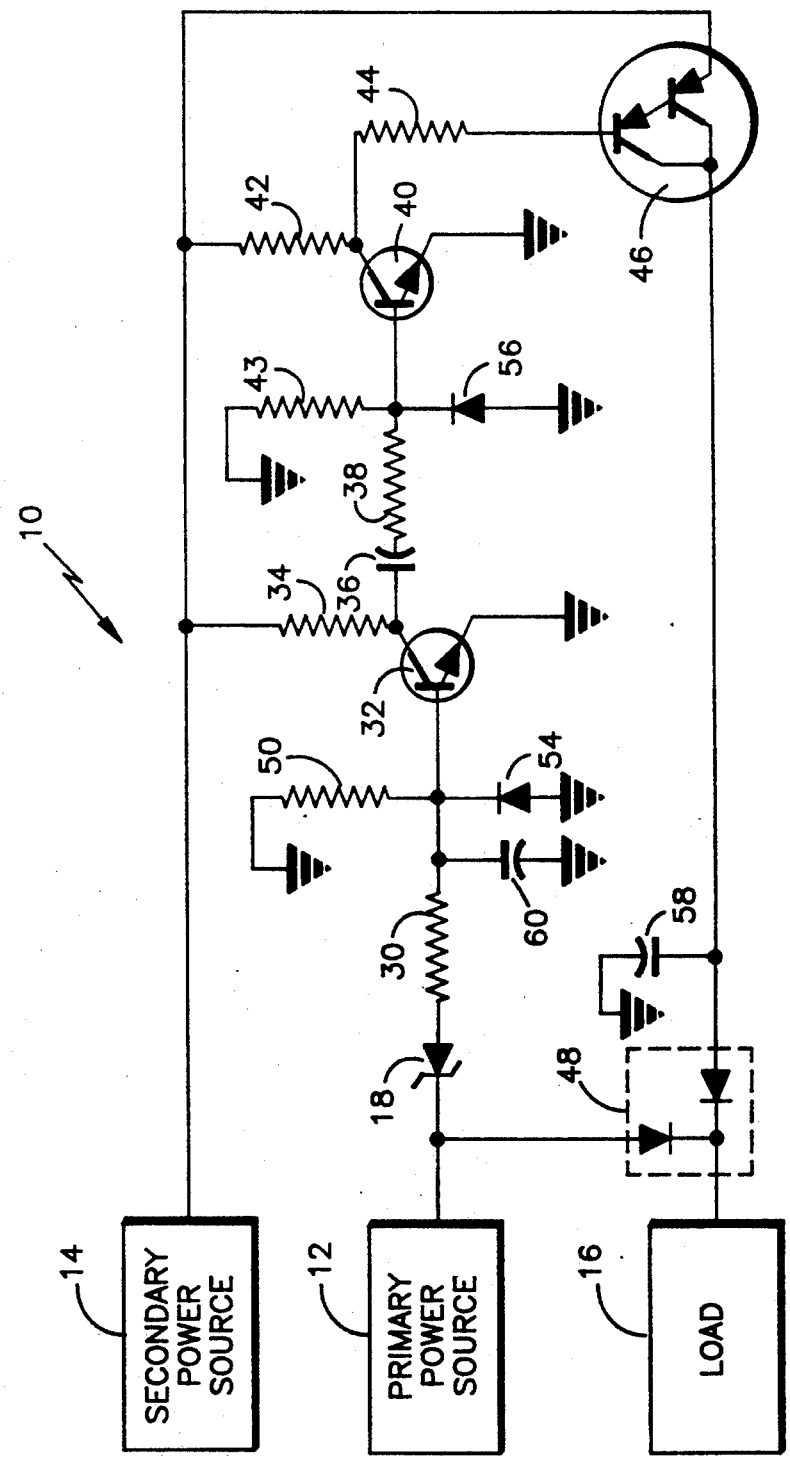

POWER SOURCE TRANSFERRING

This invention was made with Government support under a contract awarded by the Department of the Army. The Government has certain rights in this invention.

DESCRIPTION

1. Technical Field

This invention relates to the field electrical power and more particularly to the field of transferring electrical power.

2. Background Art

The failure of a primary generator in a helicopter causes contactors to switch to provide power from a backup generator. However, the switching time can be so long that some of the helicopter electronic equipment experiences a momentary power loss. Some of the electronic equipment, requires a relatively long warm-up time, and hence the momentary power loss is undesirable.

This problem is addressed by U.S. Pat. No. 4,638,175 to Bradford et. al. titled "Electric Power Distribution and Load Transfer System", which uses a plurality of digital and analog parts to digitally compare voltages and switch power sources in a manner which prevents the equipment from experiencing any power loss. However, the number of parts used in the Bradford invention render it complex and costly to build.

DISCLOSURE OF INVENTION

Objects of the invention include a simple and inexpensive power transfer system.

According to the present invention, a power transfer system, for coupling a secondary power signal to a load in response to loss of a primary power signal, has a first switching means which asserts a first voltage signal only in response to loss of the primary power signal, an attenuation means which asserts a second voltage signal only in response to assertion of said first voltage signal, said second signal being attenuated after a predetermined amount of time, a second switching means which asserts a third voltage signal only in response to said second voltage signal not being asserted, and a third switching means which couples the secondary power signal to the load only in response to said third voltage signal not being asserted.

The foregoing and other objects, features and advantages of the present invention will become more apparent in light of the following detailed description of exemplary embodiments thereof, as illustrated in the accompanying drawings.

BRIEF DESCRIPTION OF DRAWINGS

The sole FIGURE is a schematic diagram of a power source transfer circuit.

BEST MODE FOR CARRYING OUT THE INVENTION

Referring to the FIGURE, a helicopter power source transfer circuit 10 is provided with a primary power signal from a twenty eight volt primary power source 12, such as a generator and an AC-to-DC converter combination, and is provided with a secondary power signal from a twenty eight volt secondary power source 14, such as a battery. The power signals drive a resistive-type load 16, which can be any electrically driven electronic or electrical helicopter equipment. During normal operation, the load 16 receives all electrical power from the primary source 12. If the primary source 12 stops delivering power, the circuit 10 switches to couple the secondary power signal to the load 16 for 0.350 seconds while other circuitry (not shown) switches to provide power to the load 16 via a backup generator (not shown). The amount of time that the secondary source 14 is used for delivering power to the load 16 is limited to 0.350 seconds in order to prevent excessive power loss of the battery.

A twenty two volt zener diode 18 and a twenty kohm current limiting resistor 30 are connected in series between the primary power source 12 and the base of a first 2N2222A NPN transistor 32. The emitter of the first transistor 32 is connected to ground and the collector of the transistor 32 is connected to the secondary power source 14 via a 66.5 kohm pull-up resistor 34. While the primary power signal is asserted (i.e. the primary power source 12 is providing power), the primary power signal drives the base of the transistor 32 above the turn-on voltage (approx 0.6 volts) and turns ON (i.e. saturates) the transistor 32, thereby causing the collector voltage to become substantially equal to the emitter voltage. Since the emitter of the transistor 32 is connected to ground, whenever the transistor 32 is ON the voltage signal at the collector of the transistor 32 will be not be asserted (i.e. the voltage will be close to zero).

A 3.3 uF capacitor 36 and a one hundred ohm current limiting resistor 38 are connected in series between the collector of the first transistor 32 and the base of a second 2N2222A NPN transistor 40. The collector of the second transistor 40 is connected to the secondary power supply 14 via a ten kohm pull-up resistor 42 and the base of the second transistor 40 is connected to ground via a ten kohm resistor 43. If the first transistor 32 is ON, the signal from the collector of the first transistor 32 is not asserted (i.e. the collector voltage of the first transistor 32, is near ground), thereby turning OFF the second transistor 40 (i.e. driving the second transistor 40 to cutoff). When the second transistor 40 is OFF, no current flows through the pull-up resistor 42 and the voltage signal at the collector of the second transistor 40 is asserted (i.e. the voltage at the collector is substantially equal to the voltage of the secondary power source 14).

A four kohm current limiting resistor 44 is connected in series between the collector of the second transistor 40 and the base of a 2N6650 PNP darlington transistor 46. The emitter of the darlington transistor 46 is connected to the secondary power source 14. The collector of the darlington transistor 46 is connected in series to a Schottky diode 48, part number USD345CHR manufactured by Unitrode Co. of Watertown, Mass., which is connected in series to the load 16. When the second transistor 40 is OFF, the base of the darlington transistor 46 is provided with the asserted voltage signal which turns the darlington transistor 46 OFF, thereby isolating the load 16 from the secondary power signal. The Schottky diode 48 is interposed between the secondary power source 14 and the load 16 and between the primary power source 12 and the load 16 in order to prevent the primary power source 12 from charging the secondary power source 14 (a battery) and to prevent components within the primary power source 12 from drawing power from the secondary power source 14 when the primary power source 12 is non-operational.

The output of the primary source 12 is connected to the load 16 via the Schottky diode 48. Whenever the primary source 12 is providing the primary power signal, the first transistor 32 is turned ON and the voltage signal from the collector of the transistor 32 is not asserted, thus turning OFF the second transistor 40. When the second transistor 40 is OFF, the signal from the collector of the second transistor 40 is asserted, thus turning OFF the darlington transistor 46. When the darlington transistor 46 is OFF, the secondary power signal is isolated from the load 16 and only a nominal amount of power is drawn from the secondary source 14 through the pull-up resistor 34.

The base of the transistor 32 is connected to ground via a twenty kohm resistor 50. If there is a loss of the primary power signal, the base voltage of the first transistor 32 drops below 0.6 volts (the turn-on voltage) and the first transistor 32 is turned OFF. The zener diode 18 is chosen to have a breakdown voltage within 1% of twenty two volts in order to more exactly control the turn-off point of the transistor 32. In this regard, the zener diode 18 functions as a threshold device to provide a signal which controls turn-off of transistor 32 when the voltage of the primary power signal drops below about 23 bolts. A 1N914 diode 54 is connected between the base of the first transistor 32 and ground to protect the base of the transistor 32 from negative voltages caused by transients that occur in the circuit 10 due to switching.

After the first transistor 32 is turned OFF, the voltage signal at the collector of the first transistor 32 is asserted and the capacitor 36 begins to charge. While the capacitor 36 is charging, the positive voltage at the base of the second transistor 40 causes the second transistor 40 to be turned ON. A 1N914 diode 56 is connected between the base of the second transistor and ground protects the transistor 40 from negative voltages caused by transients that occur in the circuit 10 due to switching.

Turning ON the second transistor 40 causes the voltage signal at the collector of the second transistor 40 to not be asserted, thereby turning ON the darlington transistor 46. When the darlington transistor 46 is ON, the secondary power signal is coupled to the load 16 through the collector and emitter of the darlington transistor 46. A 100 uF holdup capacitor 58, which is connected between the collector of the darlington transistor 46 and ground, attenuates AC components of the voltage signal seen by the load 16 which are caused by switching transitions.

After approximately 0.350 seconds, the capacitor 36 is charged and the voltage signal from the collector of the first transistor 32 is attenuated and is no longer being asserted at the base of the second transistor 40, thus turning OFF the second transistor 40. When the second transistor 40 is OFF, the signal at the collector of the second transistor 40 is asserted, thus turning OFF the darlington transistor 46. The secondary power source 14, which is a battery, is meant to supply power to the load 16 for only approximately 0.350 seconds while aircraft contactors (not shown) switch to provide the load 16 with power from a backup generator (not shown).

When the primary power source 12 begins supplying power again, the first transistor 32 is turned ON following a delay. A 0.01 uF capacitor 60 is connected in parallel with the resistor 50 in order to delay the turn-on of the transistor 32, which thus delays the termination of the voltage signal which is being asserted at the collector of the transistor. The delay prevents the transistor 32 from rapidly turning ON and OFF when the magnitude of the voltage provided by the primary power source 12 is hovering around the turn-on/turn-off level. Turning ON the first transistor 32 causes the voltage signal at the collector of the transistor 32 to not be asserted, thereby initiating a discharge of the capacitor 36 through the emitter of the transistor 32. The resistor 38 limits the amount of current drawn during the discharge process and the diode 56 protects the second transistor 40 from negative voltages which may occur during the discharge process.

Even though the primary power source 12 and the secondary power source 14 are illustrated herein as a generator and a battery, respectively, the circuit 10 can be used to transfer power irrespective of the type of power sources employed. Although the invention is illustrated herein using bipolar transistors 32, 40, 46 as switches, it can be appreciated by one skilled in the art that other types of switching means, such as solid state relays or power MOSFET's, may be used instead without departing from the spirit and scope of the invention. The use of switching means other than the bipolar transistors illustrated herein may require that the sense of one or more of the voltages which control the switching means be reversed. The capacitor 36, which attenuates the voltage signal from the collector of the first transistor 32 after a predetermined amount of time, can be replaced by other means, known to one skilled in the art, for providing a time delay attenuation of a voltage signal.

The values of resistance, capacitance, etc. for the various components of the circuit 10 illustrated herein are exemplary and depend upon a variety of functional factors, such as the magnitude of the primary and secondary voltage signals, the nature of the load 16, design choice, etc., and may be modified by one skilled in the art. The values of the resistor 34 and the capacitor 36 may be modified by means known to one skilled in the art to either increase or decrease the amount of time before the voltage signal from the collector of the first transistor 32 is attenuated at the base of the second transistor 40. Many of the components of the circuit 10, such as the diodes 54, 56, do not add to the primary functionality of the circuit but instead protect components of the circuit 10 from high currents, negative voltages, undesirable AC components, etc. The Schottky diode 48 prevents power signals from flowing into the sources 12, 14 and may be eliminated if power signals flowing into the sources 12, 14 is not undesirable. The capacitor 60, for delaying the turning ON of the transistor 32, may similarly be eliminated if the delay is not desired.

Although the invention has been shown and described with respect to exemplary embodiments thereof, it should be understood by those skilled in the art that various changes, omissions and additions may be made therein and thereto, without departing from the spirit and the scope of the invention.

What is claimed is:

1. Apparatus powered only from one or both of a primary power signal and a secondary power signal, for coupling the secondary power signal to a load in response to loss of the primary power signal, comprising:
   a threshold means responsive to loss of the primary power signal below a certain voltage level for asserting a particular signal indicative of the loss of the primary power signal;

a first switching means, for asserting a first voltage signal only in response to assertion of said particular signal indicative of the loss of the primary power signal, said first switching means being a bipolar NPN transistor;

signal attenuation means, for asserting a second voltage signal only in response to assertion of said first voltage signal, said second signal being attenuated after a predetermined amount of time such that it is not being asserted, said signal attenuation means comprising a capacitor;

a second switching means, for asserting a third voltage signal only in response to said second voltage signal not being asserted, said second switching means being a bipolar NPN transistor;

a third switching means, for coupling the secondary power signal to the load only in response to said third voltage signal not being asserted, said third switching means being a bipolar PNP Darlington transistor;

means for directing power signals to prevent the primary power signal from flowing into the source of the secondary power signal and to prevent the secondary power signal from flowing into the source of the primary power signal; and means, disposed between the primary power signal and said first switch, for delaying termination of the assertion of said first voltage signal.

2. Apparatus according to claim 1, wherein said means for delaying the termination of the assertion of said first voltage signal includes a capacitor disposed between said threshold means and said first switching means.

3. Apparatus according to claim 2, wherein said means for directing power signals is a Schottky diode.

4. Apparatus according to claim 1, wherein said threshold means includes a zener diode.

* * * * *